US005888643A

United States Patent [19]

Aylward et al.

[11] Patent Number: 5,888,643

[45] Date of Patent: Mar. 30, 1999

[54] CONTROLLING BENDING STIFFNESS IN PHOTOGRAPHIC PAPER

[75] Inventors: Peter T. Aylward, Hilton; Robert P. Bourdelais, Pittsford; Douglas N. Haydock, Webster; Thaddeus S. Gula, Rochester, all of N.Y.

[73] Assignee: Eastman Kodak Company, Rochester, N.Y.

[21] Appl. No.: 862,900

[22] Filed: May 23, 1997

[51] Int. Cl.[6] .............................. G03C 1/79; B32B 3/26; B32B 23/08; B32B 27/10

[52] U.S. Cl. ....................... 428/315.9; 428/511; 428/513; 428/537.5; 430/538; 430/536

[58] Field of Search ................................ 428/315.9, 511, 428/513, 537.5; 430/538, 536

[56] References Cited

U.S. PATENT DOCUMENTS

| | | | |
|---|---|---|---|
| Re. 34,742 | 9/1994 | Maier et al. | 428/36.5 |
| 3,944,699 | 3/1976 | Mathews et al. | 428/220 |
| 4,187,113 | 2/1980 | Mathews et al. | 430/533 |
| 4,283,486 | 8/1981 | Aono et al. | 430/538 |
| 4,377,616 | 3/1983 | Ashcraft et al. | 428/213 |
| 4,579,810 | 4/1986 | Johnston et al. | 430/538 |
| 4,632,869 | 12/1986 | Park et al. | 428/315.5 |
| 4,758,462 | 7/1988 | Park et al. | 428/213 |
| 4,778,782 | 10/1988 | Ito et al. | 428/513 |
| 4,912,333 | 3/1990 | Roberts et al. | 250/487.1 |
| 4,994,312 | 2/1991 | Maier et al. | 428/36.5 |
| 5,055,371 | 10/1991 | Lee et al. | 430/216 |
| 5,100,862 | 3/1992 | Harrison et al. | 503/227 |
| 5,110,788 | 5/1992 | Katayama et al. | 428/513 |
| 5,141,685 | 8/1992 | Maier et al. | 264/45.3 |
| 5,227,024 | 7/1993 | Gomez | 162/142 |
| 5,244,861 | 9/1993 | Campbell et al. | 503/227 |
| 5,275,854 | 1/1994 | Maier et al. | 428/36.5 |
| 5,434,039 | 7/1995 | Nagata et al. | 430/538 |
| 5,443,915 | 8/1995 | Wilkie et al. | 428/461 |
| 5,466,519 | 11/1995 | Shirakura et al. | 430/538 |
| 5,514,460 | 5/1996 | Surman et al. | 428/304.1 |

FOREIGN PATENT DOCUMENTS

| | | |
|---|---|---|
| 0 183 467 | 6/1986 | European Pat. Off. . |
| 0 316 081 | 5/1989 | European Pat. Off. . |
| 1-282552 | 11/1989 | Japan . |
| 1330510 | 9/1973 | United Kingdom . |
| 2108865 | 5/1983 | United Kingdom . |
| WO 94/04961 | 3/1994 | WIPO . |
| WO 94/06849 | 3/1994 | WIPO . |
| WO 96/12766 | 5/1996 | WIPO . |

*Primary Examiner*—Richard L. Schilling
*Attorney, Agent, or Firm*—Paul A. Leipold

[57] ABSTRACT

The invention relates to a method of providing a photographic imaging element having a bending stiffness between 150 and 250 millinewtons and a caliper thickness between about 0.18 mm and about 0.28 mm, comprising providing a laminated base sheet comprising a paper sheet having a Young's modulus of between about 13800 MPa to 2760 MPa in the machine direction and a Young's modulus of 6900 MPa to 1380 MPa in the cross direction, and having a biaxially oriented sheet on each side of said paper sheet having a Young's modulus of 690 MPa to 5520 MPa in the machine direction and a Young's modulus of 690 MPa to 5520 MPa in the cross machine direction and coating said laminated base sheet with photosensitive layers.

20 Claims, No Drawings

CONTROLLING BENDING STIFFNESS IN PHOTOGRAPHIC PAPER

FIELD OF THE INVENTION

This invention relates to photographic materials. In a preferred embodiment it relates to photographic color paper of varied stiffness.

BACKGROUND OF THE INVENTION

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult requiring great care and expense to ensure proper laydown and cooling of the polyethylene layers. One defect in prior formation techniques is caused when an air bubble is trapped between the forming roller and the polyethylene which will form the surface for casting of photosensitive materials. This air bubble will form a pit that will cause a defect in the photographic performance of photographic materials formed on the polyethylene. It would be desirable if a more reliable and improved surface could be formed at less expense.

In color papers there is a need for providing color papers with improved resistance to curl. Present color papers will curl during development and storage. Such curl is thought to be caused by the different properties of the layers of the color paper as it is subjected to the developing and drying processes. Humidity changes during storage of color photographs lead to curling. There are particular problems with color papers when they are subjected to extended high humidity storage such as at greater than 50% relative humidity. Extremely low humidity of less than 20% relative humidity also will cause photographic papers to curl.

In photographic papers the polyethylene layer also serves as a carrier layer for titanium dioxide and other whitener materials as well as tint materials. It would be desirable if the colorant materials rather than being dispersed throughout the polyethylene layer could be concentrated nearer the surface of the layer where they would be more effective photographically.

It has been proposed in U.S. Pat. No. 5,244,861 to utilize biaxially oriented polypropylene in receiver sheets for thermal dye transfer.

There is need in the use of photographic papers to have a variety of properties of paper available to the consumer. For some uses it is desirable that the paper be light in weight and flexible. For instance, when the photographs must be mailed or used as a laminating material, it is desirable that the materials be light in weight. For some uses such as for stand up display and to convey a sense of value, it is desirable that the photographs have a heavy stiff feel. It would be desirable if photographic materials could be easily produced with a variety of stiffness and caliper characteristics so that a variety of consumer desires could be easily met. Present materials have a limited ability to be varied as the thickness of the base paper and the thickness of the polyethylene layer on the paper are the only factors that can be varied easily. Further the cost of forming stiff paper is substantial as increases in the amount of polyethylene and in the thickness of paper are expensive. In addition, the increases or decreases in caliper that are required for papers of increased or decreased stiffness lead to difficulties in handling in processing machines for formation of the photosensitive layers and in development after exposure.

PROBLEM TO BE SOLVED BY THE INVENTION

There is a need for the ability to vary stiffness and caliper of photographic papers in a manner that is independent. There is need to be able to adjust stiffness without affecting caliper and to adjust caliper without affecting stiffness.

SUMMARY OF THE INVENTION

An object of the invention is to provide a method of adjusting caliper and stiffness independently.

A further object is to provide photographic papers of a range of stiffness and caliper.

Another object is to provide photographic papers of varied stiffness.

These and other objects are accomplished by a method of providing a photographic imaging element having a bending stiffness between 150 and 250 millinewtons and a caliper thickness between about 0.18 mm and about 0.28 mm comprising providing a laminated base sheet comprising a paper sheet having a Young's modulus of between about 13800 MPa to 2760 MPa in the machine direction and a Young's modulus of 6900 MPa to 1380 MPa in the cross direction, and having a biaxially oriented sheet on each side of said paper sheet having a Young's modulus of 690 MPa to 5520 MPa in the machine direction and a Young's modulus of 690 MPa to 5520 MPa in the cross machine direction and coating said laminated base sheet with photosensitive layers.

Another embodiment of the invention provides a laminated base sheet for imaging substrates comprising a paper sheet having a Young's modulus of between about 13800 MPa to 2760 MPa in the machine direction and a Young's modulus of 6900 MPa to 1380 MPa in the cross direction and having a biaxially oriented sheet on each side of said paper sheet having a Young's modulus of 690 MPa to 5520 MPa in the machine direction and a Young's modulus of 690 MPa to 5520 MPa in the cross machine direction.

ADVANTAGEOUS EFFECT OF THE INVENTION

The invention allows the formation of papers that have a variety of stiffness without changing caliper. Further caliper can be changed without changing the stiffness of a paper.

DETAILED DESCRIPTION OF THE INVENTION

The invention has numerous advantages over prior methods of adjusting stiffness and caliper in photographic papers. The invention allows the consumer to be provided with papers that are light weight but strong. The papers of the invention further can be provided in a form that is stiff and thick. The invention also allows the formation of stiff papers that are nevertheless light in weight. The light weight prints of the invention allow storage of prints in albums that are not as bulky. Further files containing photos such as used by real estate and insurance companies can be thinner.

There are numerous advantages of the invention over prior practices in the art. The invention provides a photographic element that has much less tendency to curl when exposed to extremes of humidity. Further, the invention provides a photographic paper that is much lower in cost as the criticalities of the formation of the polyethylene are removed. There is no need for the difficult and expensive casting and cooling in forming a surface on the polyethylene layer as the biaxially oriented polymer sheet of the invention provides a high quality surface for casting of photosensitive layers. The optical properties of the photographic elements in accordance with the invention are improved as the color materials may be concentrated at the surface of the biaxially oriented sheet for most effective use with little waste of the colorant materials. Photographic materials utilizing microvoided sheets of the invention have improved resistance to tearing. The photographic materials of the invention are lower in cost to produce as the microvoided sheet may be scanned for quality prior to assembly into the photographic member. With present polyethylene layers the quality of the layer cannot be assessed until after complete formation of the base paper with the polyethylene waterproofing layer attached. Therefore, any defects result in discard of an expensive product. The invention allows faster hardening of photographic paper emulsion, as water vapor is not transmitted from the emulsion through the biaxially oriented sheets.

Another advantage of the microvoided sheets of the invention is that they are more opaque than titanium dioxide loaded polyethylene of present products. They achieve this opacity partly by the use of the voids as well as the improved concentration of titanium dioxide at the surface of the sheet. The photographic elements of this invention are more scratch resistant as the oriented polymer sheet on the back of the photographic element resists scratching and other damage more readily than polyethylene. These and other advantages will be apparent from the detailed description below.

The invention is described with the substrate preferably used for a photographic imaging element. However, the laminated base of the invention also could be used for imaging with ink jet printers, thermal imaging, and electrophotographic imaging.

The method of the invention is accomplished by varying the properties of the biaxially oriented sheet which is laminated to both sides of the base paper to make the laminated substrate utilized for photographic paper. The papers of the invention may be provided with a bending stiffness between 150 and 200 millinewtons. This bending stiffness is provided at a caliper stiffness between about 0.18 and about 0.28 mm. Within these ranges a variety of papers may be formed that are strong but provided with any desired caliper or stiffness.

The terms as used herein, “top”, “upper”, “emulsion side”, and “face” mean the side of a photographic member bearing the imaging layers. The terms “bottom”, “lower side”, and “back” mean the side of the photographic member opposite from the side bearing the photosensitive imaging layers or developed image.

Any suitable biaxially oriented polyolefin sheet may be used for the sheet on the top side of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462 and 4,632,869, the disclosure of which is incorporated for reference.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of “percent of solid density” is calculated as follows:

$$\frac{\text{Composition Sheet Density}}{\text{Polymer Density}} \times 100 = \%\text{ of solid Density}$$

Percent solid density should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 100 microns, preferably from 20 to 70 microns. Below 20 microns, the microvoided sheets may not be thick enough to minimize any inherent non-planarity in the support and would be more difficult to manufacture. At thicknesses higher than 70 microns, little improvement in either surface smoothness or mechanical properties are seen, and so there is little justification for the further increase in cost for extra materials.

The biaxially oriented sheets of the invention preferably have a water vapor permeability that is less than $1.55\times10^{-4}$ $g/mm^2/day/atm$. This allows faster emulsion hardening during formation, as the laminated invention support does not transmit water vapor from the emulsion layers during coating of the emulsions on the support. The transmission rate is measured by ASTM F1249.

“Void” is used herein to mean devoid of added solid and liquid matter, although it is likely the “voids” contain gas. The void-initiating particles which remain in the finished packaging sheet core should be from 0.1 to 10 microns in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula $Ar—C(R)═CH_2$, wherein Ar represents an aromatic hydrocarbon radical, or an aromatic halohydrocarbon radical of the benzene series and R is hydrogen or the methyl radical; acrylate-type monomers include monomers of the formula $CH_2{=}C(R')—C(O)(OR)$ wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2{=}CH(O)COR$, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Addenda may be added to the core matrix and/or to the skins to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet. For photographic use, a white base with a slight bluish tint is preferred.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a typical biaxially oriented, microvoided sheet of the invention is as follows:

| |
|---|
| solid skin layer |
| microvoided core layer |
| solid skin layer |

The sheet on the side of the base paper opposite to the emulsion layers may be any suitable sheet. The sheet may or may not be microvoided. It may have the same composition as the sheet on the top side of the paper backing material. Biaxially oriented sheets are conveniently manufactured by coextrusion of the sheet, which may contain several layers, followed by biaxial orientation. Such biaxially oriented sheets are disclosed in, for example, U.S. Pat. No. 4,764, 425, the disclosure of which is incorporated for reference.

The preferred biaxially oriented sheet is a biaxially oriented polyolefin sheet, most preferably a sheet of polyethylene or polypropylene. The thickness of the biaxially oriented sheet should be from 10 to 150 microns. Below 15 microns, the sheets may not be thick enough to minimize any inherent non-planarity in the support and would be more difficult to manufacture. At thicknesses higher than 70 microns, little improvement in either surface smoothness or mechanical properties are seen, and so there is little justification for the further increase in cost for extra materials.

Suitable classes of thermoplastic polymers for the biaxially oriented sheet include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. No. 2,465,319 and U.S. Pat. No. 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous. phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the back side of the laminated base can be made with layers of the same polymeric material, or it can be made with layers of different polymeric composition. For compatibility, an auxiliary layer can be used to promote adhesion of multiple layers.

Addenda may be added to the biaxially oriented sheet to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet.

The coextrusion, quenching, orienting, and heat setting of these biaxially oriented sheets may be effected by any process which is known in the art for producing oriented sheet, such as by a flat sheet process or a bubble or tubular process. The flat sheet process involves extruding or coextruding the blend through. a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching.

The biaxially oriented sheet on the back side of the laminated base, while described as having preferably at least one layer, may also be provided with additional layers that may serve to change the properties of the biaxially oriented sheet. A different effect may be achieved by additional layers. Such layers might contain tints, antistatic materials, or slip agents to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These biaxially oriented sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

The structure of a typical biaxially oriented sheet of the invention is as follows:

| |
|---|
| treated skin layer |
| solid core layer |

The support to which the microvoided composite sheets and biaxially oriented sheets are laminated for the laminated support of the photosensitive silver halide layer may be a polymeric, a synthetic paper, cloth, woven polymer fibers, or a cellulose fiber paper support, or laminates thereof. The base also may be a microvoided polyethylene terephalate such as disclosed in U.S. Pat. Nos. 4,912,333; 4,994,312 and 5,055,371, the disclosure of which is incorporated for reference.

The prefered support is a photographic grade cellulose fiber paper. When using a cellulose fiber paper support, it is preferable to extrusion laminate the microvoided composite sheets to the base paper using a polyolefin resin. Extrusion laminating is carried out by bringing together the biaxially oriented sheets of the invention and the base paper with application of an adhesive between them followed by their being pressed in a nip such as between two rollers. The adhesive may be applied to either the biaxially oriented sheets or the base paper prior to their being brought into the nip. In a preferred form the adhesive is applied into the nip simultaneously with the biaxially oriented sheets and the base paper. The adhesive may be any suitable material that does not have a harmful effect upon the photographic element. A preferred material is polyethylene that is melted at the time it is placed into the nip between the paper and the biaxially oriented sheet.

During the lamination process, it is desirable to maintain control of the tension of the biaxially oriented sheet(s) in order to minimize curl in the resulting laminated support. For high humidity applications (>50% RH) and low humidity applications (<20% RH), it is desirable to laminate both a front side and back side film to keep curl to a minimum.

In one preferred embodiment, in order to produce photographic elements with a desirable photographic look and feel, it is preferable to use relatively thick paper supports (e.g., at least 120 $\mu$m thick, preferably from 120 to 250 $\mu$m thick) and relatively thin microvoided composite sheets (e.g., less than 50 $\mu$m thick, preferably from 20 to 50 $\mu$m thick, more preferably from 30 to 50 $\mu$m thick).

The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process*, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers; thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23,113 (1979). Examples of processes for preparing intentionally reduction sensitized silver halide emulsions are described in EP 0 348934 A1 (Yamashita), EP 0 369491 (Yamashita), EP 0 371388 (Ohashi), EP 0 396424 Al (Takada), EP 0 404142 A1 (Yamada), and EP 0 435355 A1 (Makino).

The photographic elements of this invention may use emulsions doped with Group VIII metals such as iridium, rhodium, osmium, and iron as described in *Research Disclosure*, September 1994, Item 36544, Section I, published by Kenneth Mason Publications, Ltd., Dudley Annex, 12a North Street, Emsworth, Hampshire P010 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of-Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 microns.

In the following Table, reference will be made to (1) *Research Disclosure*, December 1978, Item 17643, (2) *Research Disclosure*, December 1989, Item 308119, and (3) *Research Disclosure*, September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV | morphology and preparation. Emulsion preparation including |
| | I, II, III, IX | hardeners, coating aids, |
| 3 | A & B | addenda, etc. |
| 1 | III, IV | Chemical sensitization and |
| 2 | III, IV | spectral sensitization/ |
| 3 | IV, V | desensitization |
| 1 | V | UV dyes, optical |
| 2 | V | brighteners, luminescent |
| 3 | VI | dyes |
| 1 | VI | Antifoggants and stabilizers |
| 2 | VI | |
| 3 | VII | |
| 1 | VIII | Absorbing and scattering |
| 2 | VIII, XIII, XVI | materials; Antistatic layers; matting agents |
| 3 | VIII, IX C & D | |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

The laminated substrate of the invention may have copy restriction features incorporated such as disclosed in U.S. patent application Ser. No. 08/598,785 filed Feb. 8, 1996 and application Ser. No. 08/598,778 filed on the same day. These applications disclose rendering a document copy restrictive by embedding into the document a pattern of invisible microdots. These microdots are, however, detectable by the electro-optical scanning device of a digital document copier. The pattern of microdots may be incorporated throughout the document. Such documents may also have colored edges or an invisible microdot pattern on the back side to enable users or machines to read and identify the media. The media may take the form of sheets that are capable of bearing an image. Typical of such materials are photographic paper and film materials composed of polyethylene resin coated paper, polyester, (poly)ethylene naphthalate, and cellulose triacetate based materials.

The microdots can take any regular or irregular shape with a size smaller than the maximum size at which individual microdots are perceived sufficiently to decrease the usefulness of the image, and the minimum level is defined by the detection level of the scanning device. The microdots may be distributed in a regular or irregular array with center-to-center spacing controlled to avoid increases in document density. The microdots can be of any hue, brightness, and saturation that does not lead to sufficient detection by casual observation, but preferably of a hue least resolvable by the human eye, yet suitable to conform to the sensitivities of the document scanning device for optimal detection.

In one embodiment the information-bearing document is comprised of a support, an image-forming layer coated on the support and pattern of microdots positioned between the support and the image-forming layer to provide a copy restrictive medium. Incorporation of the microdot pattern into the document medium can be achieved by various printing technologies either before or after production of the original document. The microdots can be composed of any colored substance, although depending on the nature of the document, the colorants may be translucent, transparent, or opaque. It is preferred to locate the microdot pattern on the support layer prior to application of the protective layer, unless the protective layer contains light scattering pigments. Then the microdots should be located above such layers and preferably coated with a protective layer. The microdots can be composed of colorants chosen from image dyes and filter dyes known in the photographic art and dispersed in a binder or carrier used for printing inks or light-sensitive media.

In a preferred embodiment the creation of the microdot pattern as a latent image is possible through appropriate temporal, spatial, and spectral exposure of the photosensitive materials to visible or non-visible wavelengths of electromagnetic radiation. The latent image microdot pattern can be rendered detectable by employing standard photographic chemical processing. The microdots are particularly useful for both color and black-and-white image-forming photographic media. Such photographic media will contain at least one silver halide radiation sensitive layer, although typically such photographic media contain at least three silver halide radiation sensitive layers. It is also possible that such media contain more than one layer sensitive to the same region of radiation. The arrangement of the layers may take any of the forms known to one skilled in the art, as discussed in *Research Disclosure* 37038 of February 1995.

The following examples illustrate the practice of this invention. They are not intended to be exhaustive of all possible variations of the invention. Parts and percentages are by weight unless otherwise indicated. Examples 1–5 are general examples of laminated base materials. The higher number examples better illustrate the invention as herein claimed.

Commercial Grade Paper of Examples

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An about 46.5 lbs. per 1000 sq. ft. (ksf) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

EXAMPLES

Example 1

The following laminated photographic base was prepared by extrusion laminating the following sheets to both sides of a photographic grade cellulose paper support:

Top sheet: (Emulsion side)

OPPalyte 350 TW (Mobil Chemical Co.)

A composite sheet (38 μm thick) (d=0.62 g/cc) consisting of a microvoided and oriented polypropylene core (approximately 73% of the total sheet thickness), with a titanium dioxide pigmented non-microvoided oriented polypropylene layer on each side; the void initiating material is poly(butylene terephthalate).

Bottom sheet: (Back side)

BICOR 70 MLT (Mobil Chemical Co.)

A one-side matte finish, one-side treated polypropylene sheet (18 μm thick) (d=0.9 g/cc) consisting of a solid oriented polypropylene core.

Both the above top and bottom sheets were extrusion laminated to a photographic grade cellulose paper support with a clear polyolefin (25 $g/m^2$).

This laminated support was then coated with a color photosensitive silver halide layer.

To evaluate curl of the above photographic element the Kodak Curl Test was used.

This test measures the amount of curl in a parabolically deformed sample. A 8.5 cm diameter round sample of the composite was stored at the test humidity for 21 days. The amount of time required depends on the vapor barrier properties of the laminates applied to the moisture sensitive paper base, and it should be adjusted as necessary by determining the time to equilibrate the weight of the sample in the test humidity. The curl readings are expressed in ANSI curl units, specifically, 100 divided by the radius of curvature in inches.

The radius of curvature is determined by visually comparing the curled shape, sighting along the axis of curl, with standard curves in the background. The standard duration of the test is 2 curl units. The curl may be positive or negative, and for photographic products, the usual convention is that the positive direction is curling towards the photosensitive layer.

The curl results for Example 1 are presented in Table I below:

TABLE I

| | curl units 100/r | |
|---|---|---|
| % Humidity | Control | Example 1 |
| 5 | 22 | 12 |
| 20 | 6 | 4 |
| 50 | −7 | −1 |
| 85 | −18 | 2 |

The data above show that photographic grade cellulose paper, when extrusion laminated on both sides with a biaxially oriented sheet, is superior for photographic paper curl compared to photographic bases used for related prior art bases.

Example 2

The following laminated photographic base was prepared by extrusion laminating the following sheets to both sides a photographic grade cellulose paper support:

Top sheet: (Emulsion side)

PF1. OPPalyte 350 TW (Mobil Chemical Co.).

A composite sheet (38 μm thick) (d=0.50 g/cc) consisting of a microvoided and oriented polypropylene core (approximately 73% of the total sheet thickness), with a titanium dioxide pigmented non-microvoided oriented polypropylene layer on each side; the void initiating material is poly(butylene terephthalate).

PF2. OPPalyte 350 TW (Mobil Chemical Co.)

A composite sheet (38 μm thick) (d=0.70 g/cc) consisting of a microvoided and oriented polypropylene core (approximately 73% of the total sheet thickness), with a titanium dioxide pigmented non-microvoided oriented polypropylene layer on each side; the void initiating material is poly(butylene terephthalate).

PF3. OPPalyte 350 TW (Mobil Chemical Co.)

A composite sheet (38 μm thick) (d=0.90 glcc) consisting of a solid and oriented polypropylene sheet.

Bottom sheet:

BICOR 70 MLT (Mobil Chemical Co.)

A one-side matte finish, one-side treated polypropylene sheet (18 μm thick) (d=0.9 g/cc) consisting of a solid oriented polypropylene core.

The following three samples were made by extrusion laminating to a photographic grade cellulose paper support with a clear polyolefin (25 $g/m^2$):

Support A: PF1 top sheet and 70 MLT bottom sheet

Support B: PF2 top sheet and 70 MLT bottom sheet

Support C: PF3 top sheet and 70 MLT bottom sheet

To evaluate the opacity of the above photographic elements the Hunter spectrophotometer CIE system D65 was used to perform a standard opacity test. In this test a control sample consisting of a standard color photographic paper was used to compare the results. This opacity test uses a sample cut to 25×106 cm in size and measuring the opacity of the samples. The percent opacity was calculated as follows:

$$\frac{\text{Sample Opacity}}{\text{Control Opacity}} \times 100 = \%\ \text{Opacity}$$

where sample opacity equals the measured opacity for the support samples and the control opacity equals the opacity of standard color photographic support. The results are presented in Table II below:

TABLE II

Opacity Improvement Data Table

| Support | % Opacity |
|---|---|
| Support A | 103.40% |
| Support B | 100.50% |
| Support C | 98.20% |
| Control | 100% |

The data above show by that extrusion laminating microvoided biaxially oriented sheets (in the case of Support A and Support B) to standard cellulose photographic paper, the opacity of the photographic support is superior compared to photographic supports used for related prior art supports. The Support C being non-microvoided has less opacity. This demonstrates the superior opacity of microvoided Supports A and B when compared to the control. Support C would be satisfactory for uses where opacity was not of prime importance such as when it is overcoated with titanium dioxide but still achieves the benefits of increased resistance to curl and improved image quality.

Example 3

The following laminated photographic base was prepared by extrusion laminating the following sheets to both sides of a photographic grade cellulose paper support.

Top sheet:

OPPalyte 350 TW (Mobil Chemical Co.)

A composite sheet (38 μm thick) (d=0.75 g/cc) consisting of a microvoided and oriented polypropylene core (approximately 73% of the total sheet thickness), with a titanium dioxide pigmented system (including required color adjustment) non-microvoided oriented polypropylene layer on the one side and a clear non-microvoided oriented polypropylene layer side; the void initiating material is poly(butylene terephthalate).

Bottom sheet:

BICOR 70 MLT (Mobil Chemical Co.)

A one-side matte finish, one-side treated polypropylene sheet (18 μm thick) (d=0.9 g/cc) consisting of a solid oriented polypropylene core.

Both the above top and bottom sheets were extrusion laminated to a photographic grade cellulose paper support with a clear polyolefin (25 $g/m^2$).

It was not necessary to coat this laminated support with a color photosensitive silver halide layer, since the whiteness is measured before other photosensitive layers are added.

To evaluate whiteness of the above photographic element, The HUNTER spectrophotometer CIE system D65 procedure was used to measure L Star UVO (ultraviolet filter out). In this test a control sample consisting of a standard color photographic paper was used to compare results. L Star UVO values of 92.95 are considered normal. The results for the example were 93.49, a significant change in the desirable direction.

The data above show that photographic grade cellulose paper, when extrusion laminated on both sides with a biaxially oriented sheet, is superior for photographic whiteness compared to photographic bases used for related prior art bases.

Example 4

The following laminated photographic base was prepared by extrusion laminating the following sheets to both sides of a photographic grade cellulose paper support.

Top sheet:

OPPalyte 350 TW (Mobil Chemical Co.)

A composite sheet (38 μm thick) (d=0.62 g/cc) consisting of a microvoided and oriented polypropylene core (approximately 73% of the total sheet thickness), with a titanium dioxide pigmented non-microvoided oriented polypropylene layer on each side; the void initiating material is poly(butylene terephthalate).

Bottom sheet:

BICOR 70 MLT (Mobil Chemical Co.)

A one-side matte finish, one-side treated polypropylene sheet (18 μm thick) (d=0.9 g/cc) consisting of a solid oriented polypropylene core.

The assembled structure has demonstrated superior tear resistance over other paper base structures that are coated with polyethylene or other polyolefins.

To evaluate tear resistance, the above structure and control samples of standard color support were tested by Elmendorf Tear testing using TAPPI Method 414. The results are given in the Table III below.

TABLE III

Elmendorf Tear Improvement by Laminating BOPP* vs. Extrusion Coating Polyethylene

| | Control | Lam. w BOPP | % Change |
|---|---|---|---|
| Mach. Direction | 99 | 122 | 23 |
| Cross Direction | 110 | 151 | 37 |

*BOPP is Biaxially Oriented Polypropylene

The data above show that photographic grade cellulose paper, when extrusion laminated on both sides with a biaxially oriented sheet, is superior for photographic base tear resistance as compared to photographic bases used for related prior art bases.

Example 5

Yellow emulsion YE1 was prepared by adding approximately equimolar silver nitrate and sodium chloride solutions into a well-stirred reactor containing gelatin peptizer and thioether ripener. Cesium pentachloronitrosylosmate was added from 1% to 70% of the making process, and potassium iodide was added at 93% of the making process to form a band of silver iodide in the grain. The resultant emulsion contained cubic shaped grains of 0.60 μm in edge length size. This emulsion was optimally sensitized by the addition of glutarydiaminophenylsulfide followed by the addition of a colloidal suspension of aurous sulfide and heat ramped to 60° C. during which time blue sensitizing dye, Dye 1, potassium hexachloroiridate, Lippmann bromide, and 1-(3-acetamidophenyl)-5-mercaptotetrazole were added.

Magenta emulsion ME1 was precipitated by adding approximately equimolar silver nitrate and sodium chloride solutions into a well-stirred reactor containing gelatin peptizer and thioether ripener. The resultant emulsion contained cubic shaped grains of 0.30 μm in edge length size. This emulsion was optimally sensitized by the addition of a colloidal suspension of aurous sulfide and heated to 55° C. The following were then added: potassium hexachloroiridate, Lippmann bromide, and green sensitizing dye, Dye 2. The finished emulsion was then allowed to cool, and 1-(3-acetamidophenyl(-5-mercaptotetrazole was added a few seconds after the cool down began.

Cyan emulsion CE1 was precipitated by adding approximately equimolar silver nitrate and sodium chloride solutions into a well-stirred reactor containing gelatin peptizer and thioether ripener. In addition, mercury was added during the make. The resultant emulsion contained cubic shaped grains of 0.40 μm in edge length size. This emulsion was optimally sensitized by the addition of Bis(1,4,5-trimethyl-1,2,4-triazolium-3-thiolate)gold(I)fluoroborate and sodium thiosulfate followed by heat digestion at 65° C. The following were then added: 1-(3-acetamidophenyl)-5-mercaptotetrazole, potassium hexachloroiridate, and potassium bromide. The emulsion was cooled to 40° C., and the red sensitizing dye, Dye 3, was added.

Emulsions YE1, ME1, and CE1 were combined with coupler-bearing dispersions by techniques known in the art and applied to laminated base of Example 1 according to the structure shown in Format 1 to prepare a photographic element of low curl and excellent strength characteristics.

Format 1

| Item Description | Laydown mg/ft$^2$ |
|---|---|
| Layer 1 Blue Sensitive Layer | |
| Gelatin | 122 |
| Yellow emulsion YE1 (as Ag) | 20 |
| Y-1 | 45 |
| ST-1 | 45 |
| S-1 | 20. |
| Layer 2 Interlayer | |
| Gelatin | 70 |
| SC-1 | 6. |
| S-1 | 17 |
| Layer 3 Green Sensitive Layer | |
| Gelatin | 117 |
| Magenta emulsion (as Ag) | 7 |
| M-1 | 29 |
| S-1 | 8 |
| S-2 | 3 |
| ST-2 | 2 |
| ST-3 | 17.7 |
| ST-4 | 57 |
| PMT | 10 |
| Layer 4 UV Interlayer | |
| Gelatin | 68.44 |
| UV-1 | 3 |
| UV-2 | 17 |
| SC-1 | 5.13 |
| S-1 | 3 |
| S-2 | 3 |
| Layer 5 Red Sensitive Layer | |
| Gelatin | 126 |
| Cyan emulsion CE1 | 17 |
| C-1 | 39 |
| S-1 | 39 |
| UV-2 | 25 |
| S-2 | 3 |
| SC-1 | 0.3 |
| Layer 6 UV Overcoat | |
| Gelatin | 48 |
| UV-1 | 2 |
| UV-2 | 12 |
| SC-1 | 4 |
| S-1 | 2 |
| S-3 | 2 |
| Layer 7 SOC | |
| Gelatin | 60 |
| SC-1 | 2 |

APPENDIX

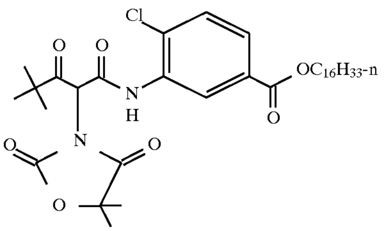

Y-1

ST-1 = N-tert-butylacrylamide/n-butyl acrylate copolymer (50:50)

S-1 = dibutyl phthalate

-continued

APPENDIX

SC-1

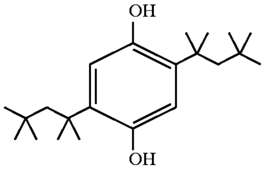

M-1

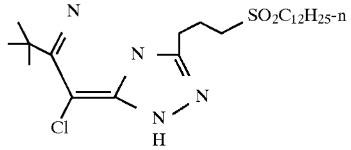

S-2 = diundecyl phthalate

ST-2

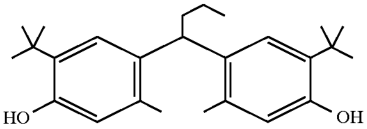

ST-3

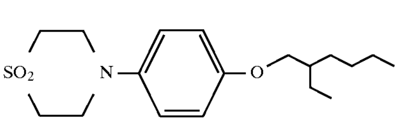

PMT = 1-phenyl-5-mercatotetrazole

ST-4

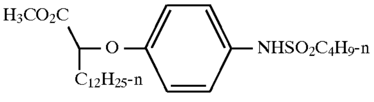

UV-1

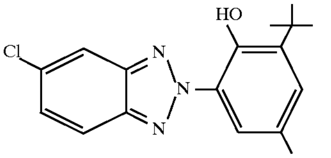

UV-2

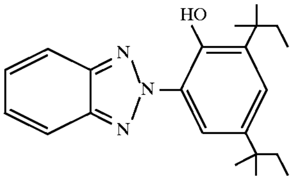

S-3 = 1, 4-Cyclohexyldimethylene bis(2-ethylhexanoate)

C-1

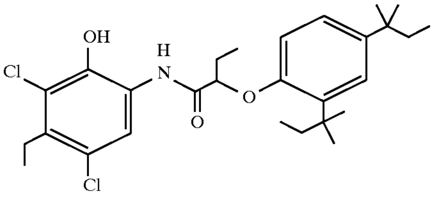

S-4 = 2-(2-Butoxyethoxy)ethyl acetate

Dye 1

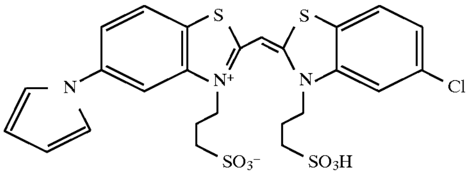

-continued

APPENDIX

Dye 2

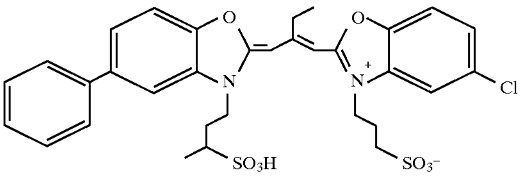

Dye 3

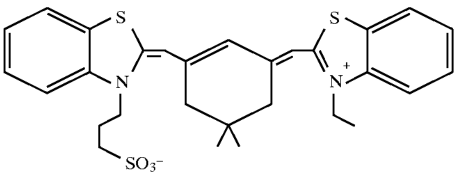

Example 6

The following laminated photographic bases were prepared by extrusion laminating the following sheets to both sides a photographic grade cellulose paper support:

Sample 1

Standard photographic support made by extrusion laminating polyethylene to both sides of the base paper. This sample is included for comparison in the stiffness test.

Sample 2

A top composite sheet (0.0356 mm thick) with a modulus of 1724 MPa consisting of a microvoided and oriented polypropylene core (approximately 73% of the total sheet thickness), with a titanium dioxide pigmented non-microvoided oriented polypropylene layer on each side; the void initiating material is poly(butylene terephthalate) was extrusion laminated (0.0114 mm) to a photographic grade cellulose base paper(0.1295 mm) with a modulus of 4482 MPa using a extruded polyolefin (25 g/m$^2$). On the back side, a composite sheet (0.0254 mm thick) with a modulus of 2675 MPa consisting of a solid, oriented polypropylene sheet was also extrusion laminated (0.0114 mm) to the above base paper using a polyolefin (25 g/m$^2$)

Sample 3

A top composite sheet (0.0254 mm thick) with a Modulus of 1724 MPa consisting of a microvoided and oriented polypropylene core (approximately 73% of the total sheet thickness), with a titanium dioxide pigmented non-microvoided oriented polypropylene layer on each side; the void initiating material is poly(butylene terephthalate) was extrusion laminated (0.0114 mm) to a photographic grade cellulose base paper (0.1295 mm) with a modulus of 6550 MPa using an extruded polyolefin (25 g/m$^2$). On the back side, a composite sheet (0.0178 mm thick) with a modulus of 2675 MPa consisting of a solid, oriented polypropylene sheet was also extrusion laminated (0.0114 mm) to the above base paper using a polyolefin (25 g/m$^2$).

Sample 4

A top composite sheet (0.0102 mm thick) with a Modulus of 1034 MPa consisting of a microvoided and oriented polypropylene core (approximately 73% of the total sheet thickness), with a titanium dioxide pigmented non-microvoided oriented polypropylene layer on each side; the void initiating material is poly(butylene terephthalate) was extrusion laminated (0.0183 mm) to a photographic grade cellulose base paper (0.2032 mm) with a modulus of 1896 MPa using an extruded polyolefin (25 g/m$^2$). On the back side, a composite sheet (0.0102 mm thick) with a modulus of 1986 MPa consisting of a solid, oriented polypropylene sheet was also extrusion laminated (0.0183 mm) to the above base paper using a polyolefin (25 g/m$^2$).

Sample 5

A top composite sheet (0.0127 mm thick) with a Modulus of 3103 MPa consisting of a microvoided and oriented polypropylene core (approximately 73% of the total sheet thickness), with a titanium dioxide pigmented non-microvoided oriented polypropylene layer on each side; the void initiating material is poly(butylene terephthalate) was extrusion laminated (0.0114 mm) to a photographic grade cellulose base paper (0.1651 mm) with a modulus of 6033 MPa using a extruded polyolefin (25 g/$m^2$). On the back side, a composite sheet (0.0127 mm thick) with a modulus of 3365 MPa consisting of a solid, oriented polypropylene sheet was also extrusion laminated (0.0114 mm) to the above base paper using a polyolefin (25 g/$m^2$)

Included below in Table IV is a summary of the top sheet, bottom sheet tie layers, and base paper for this example:

TABLE IV

| Sample | Top Sheet | Bottom Sheet | Tie Layers Both Sides | Paper Support |
|---|---|---|---|---|
| SAMPLE 1. | 207 MPa | 276 MPa | None | 3275 MPa |
| Modulus Caliper | 0.0256 mm | 0.0274 mm | | 0.1626 mm |
| SAMPLE 2. | 1724 MPa | 2675 MPa | 138 MPa | 4482 MPa |
| Modulus Caliper | 0.0356 mm | 0.0254 mm | 0.0114 mm | 0.1295 mm |
| SAMPLE 3. | 1724 MPa | 2675 MPa | 138 MPa | 6550 MPa |
| Modulus Caliper | 0.0254 mm | 0.0178 mm | 0.0114 mm | 0.1295 mm |
| SAMPLE 4. | 1034 MPa | 1986 MPa | 138 MPa | 1896 MPa |
| Modulus Caliper | 0.0102 mm | 0.0102 mm | 0.0183 mm | 0.2032 mm |
| SAMPLE 5. | 3103 MPa | 3365 MPa | 276 MPa | 6033 MPa |
| Modulus Caliper | 0.0127 mm | 0.0127 mm | 0.0114 mm | 0.1651 mm |

The bending stiffness of the above photographic elements was rated by using the LORENTZEN & WETTRE STIFFNESS TESTER, MODEL 16D. The output from this instrument is the force , in millinewtons, required to bend the cantilevered, unclamped end of a sample 20 mm long and 38.1 mm wide at an angle of 15 degrees from the unloaded position. In this test the control sample consisting of a standard color photographic paper was used to compare the results. The results of the stiffness test are presented in Table V below.

TABLE V

| Sample | Total Caliper of Composite | Stiffness milli-newtons | Purpose of Improvement |
|---|---|---|---|
| SAMPLE 1 | 0.2156 mm | 100 | Normal photographic product |
| SAMPLE 2 | 0.2134 mm | 140 | Replacement for normal product, 40% more stiffness with the same caliper as SAMPLE 1 |
| SAMPLE 3 | 0.1956 mm | 138 | Less mailing weight; more pictures in an album with the same stiffness as SAMPLE 2 |
| SAMPLE 4 | 0.2601 mm | 136 | Thick, premium feel, with the same stiffness as SAMPLE 2 |
| SAMPLE 5 | 0.2134 mm | 226 | Very stiff, premium feel, with the same caliper as SAMPLE 2 |

The data above show that photographic elements can be made where caliper can be adjusted independent of stiffness, and the stiffness of the photographic elements can be adjusted independent of caliper. As shown above, interesting combinations of stiffness and caliper can be used to satisfy particular requirements of different photographic market segments.

The invention has been described in detail with particular reference to preferred embodiments thereof, but it will be understood that variations and modifications can be effected within the spirit and scope of the invention.

We claim:

1. A laminated base sheet for imaging substrates comprising a paper sheet having a Young's modulus of between about 13800 MPa to 2760 MPa in the machine direction and a Young's modulus of 6900 MPa to 1380 MPa in the cross direction and having a biaxially oriented sheet on each side of said paper sheet having a Young's modulus of 690 MPa to 5520 MPa in the machine direction and a Young's modulus of 690 MPa to 5520 MPa in the cross machine direction.

2. The sheet of claim 1 wherein at least one of the biaxially oriented sheets on each side of said paper sheet comprises a biaxially oriented polyolefin microvoided sheet.

3. The sheet of claim 2 wherein said microvoided polyolefin sheet comprises a sheet of a % solid density between about 78 and 100%.

4. The sheet of claim 2 wherein said microvoided polyolefin sheet comprises a polypropylene sheet of a % solid density between 80 to 87%.

5. The sheet of claim 2 wherein said microvoided polyolefin sheet comprises a skin layer of nonvoided material.

6. The sheet of claim 2 wherein said microvoided polyolefin sheet comprises a skin layer on each surface.

7. The sheet of claim 2 wherein said microvoided polyolefin sheet has a thickness of between about 0.0127 mm and 0.0635 mm.

8. The sheet of claim 2 wherein said microvoided polyolefin sheet comprises a layer comprising titanium dioxide.

9. The sheet of claim 2 further comprising a layer of polyethylene between said microvoided sheet and said paper base.

10. The sheet of claim 2 wherein said microvoided sheet has a Young's modulus of between about 690 MPa to 5516 Mpa.

11. The sheet of claim 1 wherein said at least one of the biaxially oriented sheets on each side of said paper sheet comprises polyolefin.

12. The sheet of claim 11 wherein said polyolefin comprises polypropylene polymer.

13. The sheet of claim 1 wherein at least one biaxially oriented sheet comprises polypropylene and has microvoids.

14. The sheet of claim 11 wherein said polyolefin sheet comprises a layer comprising titanium dioxide.

15. The sheet of claim 13 further comprising at least one layer of polyethylene between said microvoided sheet and said paper base.

16. The sheet of claim 15 wherein said microvoided sheet has a Young's modulus of between about 690 MPa to 5516 MPa.

17. The sheet of claim 8 wherein said microvoided polyolefin sheet comprises a sheet of a % solid density between about 78 and 100%.

18. The sheet of claim 10 wherein said microvoided polyolefin sheet comprises a skin layer of nonvoided material.

19. The sheet of claim 17 wherein said microvoided polyolefin sheet comprises a skin layer of microvoided material on each surface.

20. The sheet of claim 1 wherein said paper comprises a cellulose fiber paper.

* * * * *